(12) United States Patent
Yue et al.

(10) Patent No.: US 11,509,845 B2
(45) Date of Patent: Nov. 22, 2022

(54) MULTIPLE FRAME DEFECT PIXEL DETECTION AND CORRECTION

(71) Applicant: Black Sesame International Holding Limited, Santa Clara, CA (US)

(72) Inventors: Jiaju Yue, San Jose, CA (US); Donghui Wu, San Mateo, CA (US); Bin Chen, San Jose, CA (US); Chao Wang, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 151 days.

(21) Appl. No.: 17/193,815

(22) Filed: Mar. 5, 2021

(65) Prior Publication Data

US 2022/0286631 A1    Sep. 8, 2022

(51) Int. Cl.
*H04N 5/367*    (2011.01)
*H04N 5/365*    (2011.01)
*H04N 5/57*    (2006.01)

(52) U.S. Cl.
CPC .......... *H04N 5/367* (2013.01); *H04N 5/3651* (2013.01); *H04N 5/57* (2013.01)

(58) Field of Classification Search
CPC ................................ H04N 5/3651; H04N 5/57
See application file for complete search history.

(56) References Cited

U.S. PATENT DOCUMENTS

| 10,554,914 | B1* | 2/2020 | Lin | H04N 1/409 |
| 2011/0080505 | A1* | 4/2011 | Ogino | H04N 5/365 348/E5.079 |
| 2012/0133804 | A1* | 5/2012 | Kim | H04N 5/3675 348/E9.042 |
| 2012/0188406 | A1* | 7/2012 | Hyatt | H04N 5/367 348/222.1 |
| 2014/0016005 | A1* | 1/2014 | Kishima | G06T 1/20 348/246 |
| 2014/0211049 | A1* | 7/2014 | Tsutsui | H04N 5/372 348/246 |
| 2020/0096654 | A1* | 3/2020 | Saito | G01T 1/208 |

* cited by examiner

*Primary Examiner* — Twyler L Haskins
*Assistant Examiner* — Dwight Alex C Tejano
(74) *Attorney, Agent, or Firm* — Timothy T. Wang; Ni, Wang & Massand, PLLC

(57) ABSTRACT

A method of defect pixel correction, includes, receiving at least one center pixel signal in a plurality of frames, receiving a plurality of neighboring pixel signals adjacent the center pixel in the plurality of frames, determining a brightness of the center pixel signal, determining the brightness of the plurality of neighboring pixel signals, determining if the brightness of the center pixel signal exceeds a wounded pixel threshold of the plurality of neighboring pixel signals, determining a location of the center pixel having the brightness greater than the wounded pixel threshold in at least one frame, determining a number of reoccurrences of the center pixel having the brightness greater than the wounded pixel threshold, determining if the number of reoccurrences exceeds a defect pixel threshold and updating the at least one center pixel signal to a mean of the plurality of neighboring pixel signals.

20 Claims, 9 Drawing Sheets

MULTIPLE FRAME DEFECT PIXEL DETECTION AND CORRECTION

BACKGROUND

Technical Field

The instant disclosure is related to defect pixel detection and correction and more specifically to multiple frame defect detection and correction.

Background

Currently, defective pixels may only be corrected if a pixel is dead.

SUMMARY

An example method of defect pixel correction, includes, receiving at least one center pixel signal from a center pixel in a plurality of frames, receiving a plurality of neighboring pixel signals from a plurality of neighboring pixels adjacent the center pixel in the plurality of frames, determining a brightness of the center pixel signal in the plurality of frames, determining the brightness of the plurality of neighboring pixel signals in the plurality of frames, determining if the brightness of the center pixel signal exceeds a wounded pixel threshold of the plurality of neighboring pixel signals in the plurality of frames, determining a location of the center pixel having the brightness greater than the wounded pixel threshold in at least one frame of the plurality of frames, determining a number of reoccurrences of the center pixel having the brightness greater than the wounded pixel threshold in the plurality of frames, determining if the number of reoccurrences exceeds a defect pixel threshold and updating the at least one center pixel signal to a mean of the plurality of neighboring pixel signals if the number of reoccurrences exceeds the defect pixel threshold.

Another example method of defect pixel correction, includes, receiving at least one center pixel signal from a center pixel in a plurality of frames, receiving a plurality of neighboring pixel signals from a plurality of neighboring pixels adjacent the center pixel in the plurality of frames, determining a color value of the center pixel signal in the plurality of frames, determining the color value of the plurality of neighboring pixel signals in the plurality of frames, determining if the color value of the center pixel signal exceeds a wounded pixel threshold of the plurality of neighboring pixel signals in the plurality of frames, determining a location of the center pixel having the color value greater than the wounded pixel threshold in at least one frame of the plurality of frames, determining a number of reoccurrences of the center pixel having the color value greater than the wounded pixel threshold in the plurality of frames, determining if the number of reoccurrences exceeds a defect pixel threshold and updating the at least one center pixel signal to a mean of the plurality of neighboring pixel signals if the number of reoccurrences exceeds the defect pixel threshold.

A further example method of defect pixel correction, includes, receiving a plurality of pixel signals from a plurality of adjacent pixels in a plurality of frames, determining a brightness delta of the plurality of pixel signals, determining if the brightness delta of one or more of the plurality of pixel signals exceeds a wounded pixel threshold, wherein those pixels are wounded pixels, determining a location the wounded pixels, determining a number of reoccurrences of the location of the wounded pixels in the plurality of frames, determining if the number of reoccurrences exceeds a defect pixel threshold and updating the pixel signal of the wounded pixels exceeding the defect pixel threshold to a mean of directly adjacent pixel signals.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
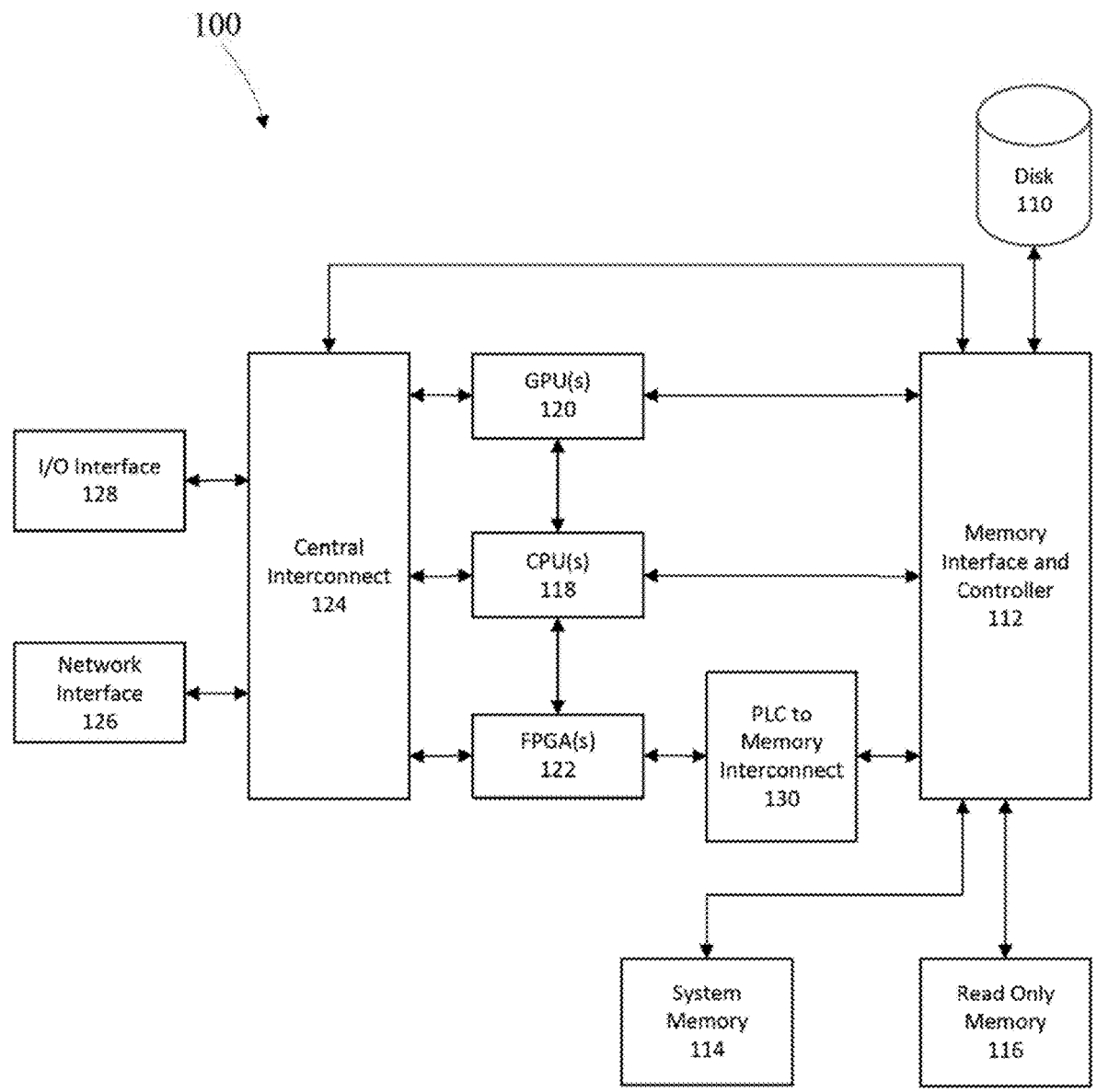
FIG. 1 is a first example system diagram in accordance with one embodiment of the disclosure.
Figure 6:
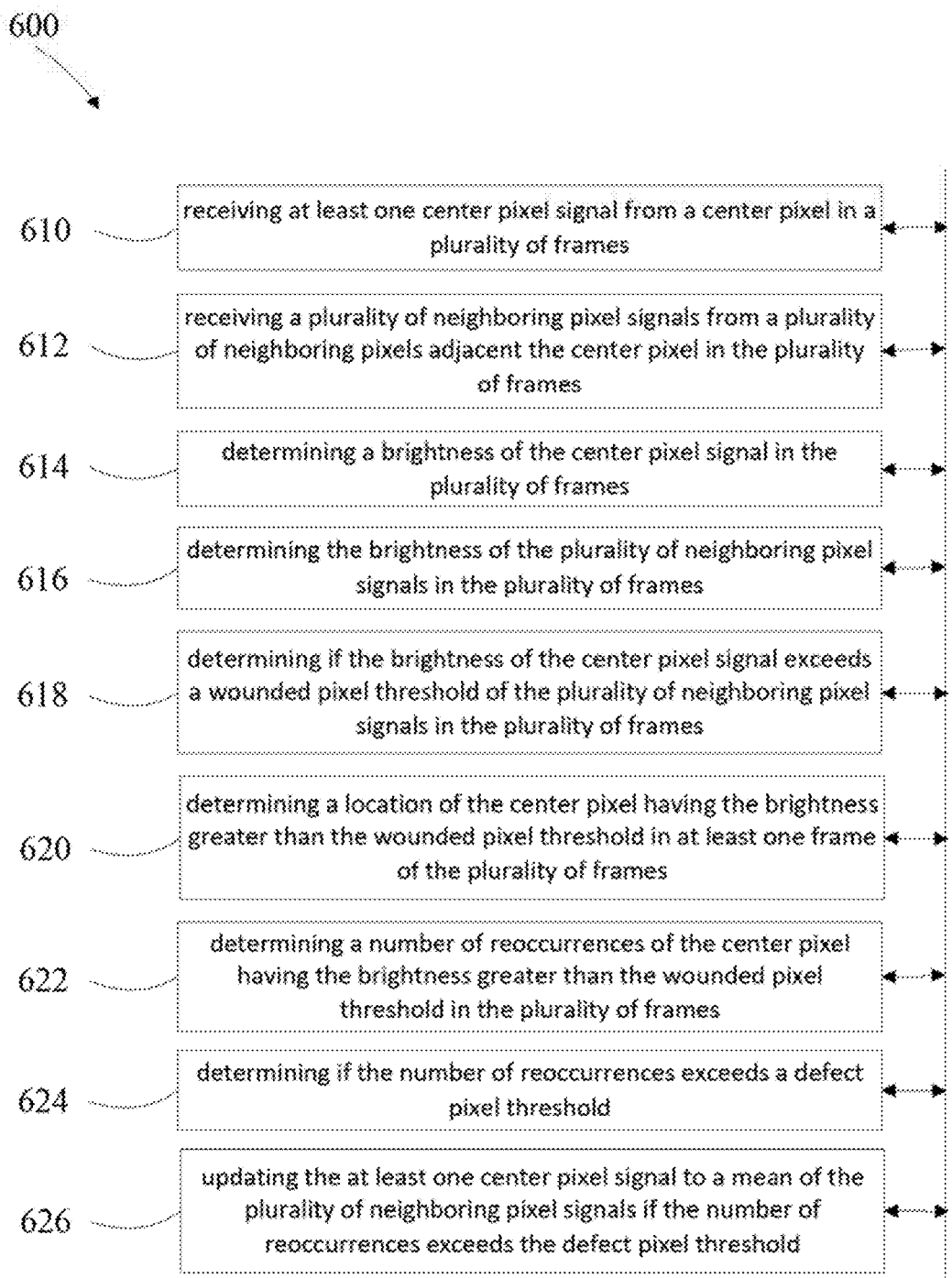
FIG. 6 is a first example method in accordance with one embodiment of the disclosure.
Figure 7:
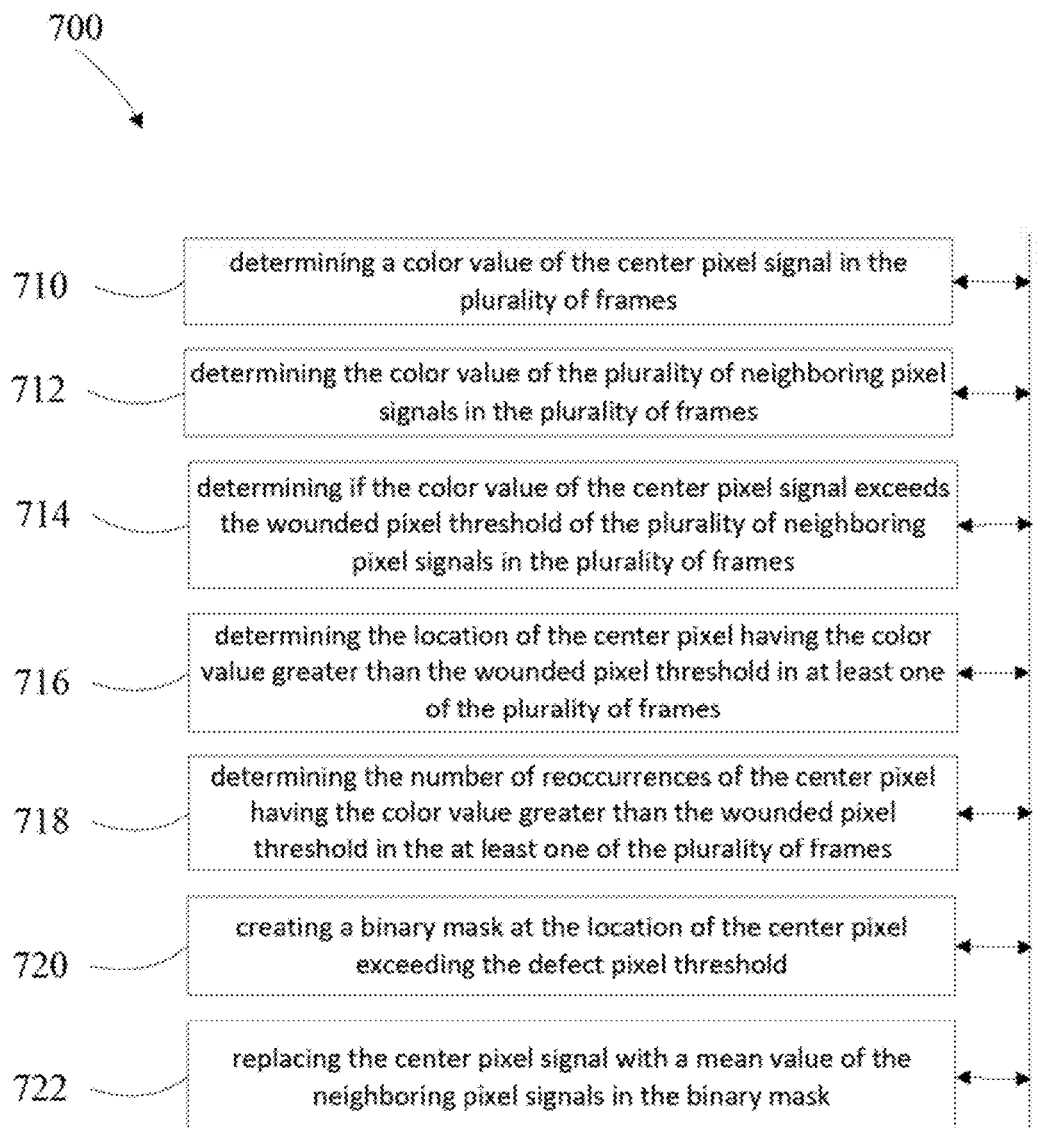
FIG. 7 is a second example method in accordance with one embodiment of the disclosure.

FIG. 1 depicts an example hybrid computational system 100 that may be used to implement neural nets associated with the operation of one or more portions or steps of the processes depicted in FIGS. 6-7. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
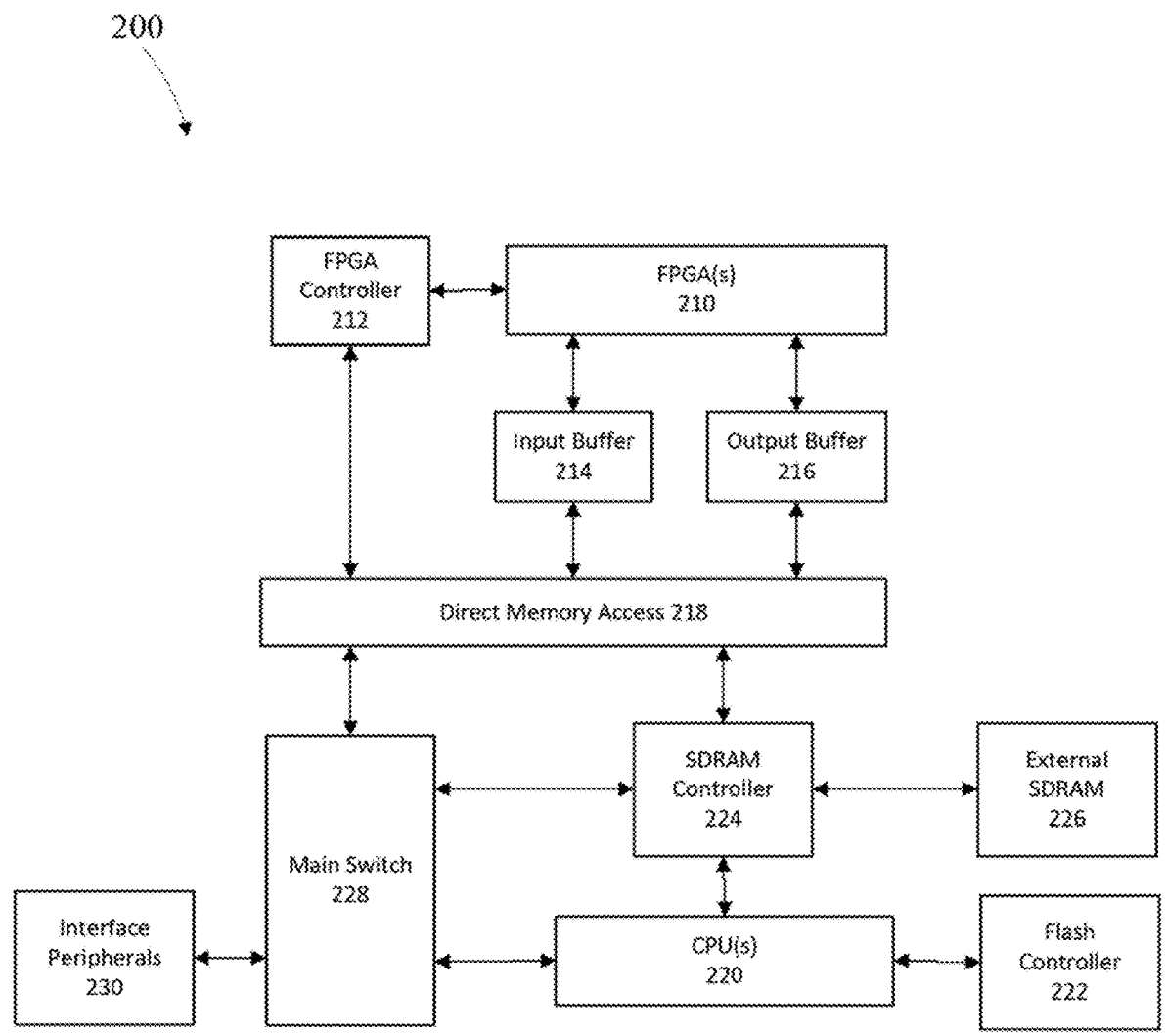
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

The image signal processing (ISP) pipeline processes raw digital data and converts the data to color images. The raw digital data may include defect data points sent as defect data signals from defect pixels. These defect pixels may negatively affect the quality of a captured image. A defect pixel may output a significantly different signal than that of neighboring pixels. The defect data point may be black, white or gray, and the defect data signal may repeatedly differ from neighboring pixel signals.

Figure 3:
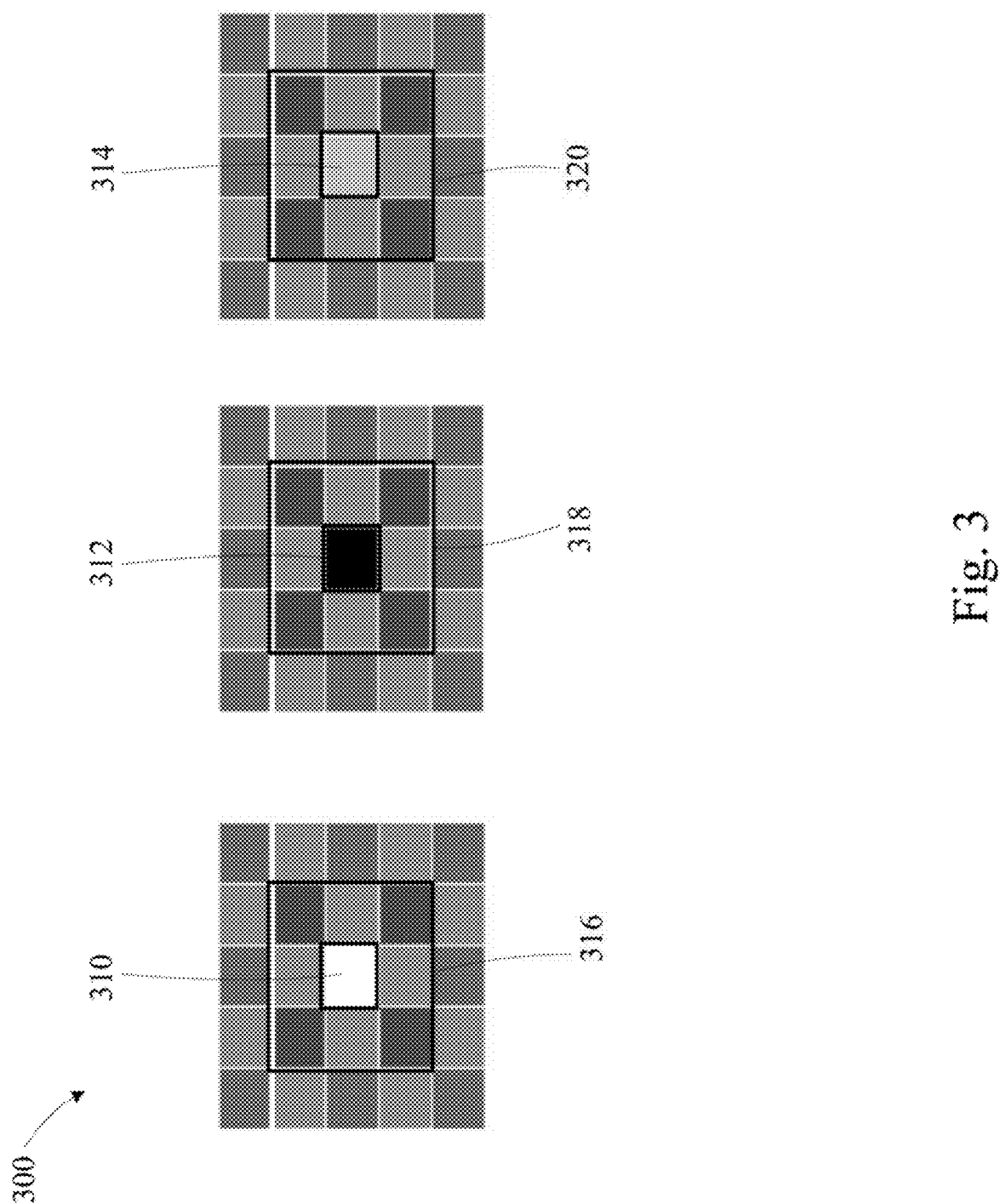
FIG. 3 is an example of dead and wounded pixels in accordance with one embodiment of the disclosure.

FIG. 3, depicts defect pixels 310, 312 and 314 having different values compared with same-channel surrounding pixels 316, 318 320. White and black pixels are termed dead pixels, grey pixels are termed wounded pixels. Current pixel correction modules cannot detect or correct wounded pixels within multiple frames. In a traditional image signal processing pipeline, the input and output are both single images. In a multi-frame image signal processing, the input is multiple images and the output is one image.

Figure 4:
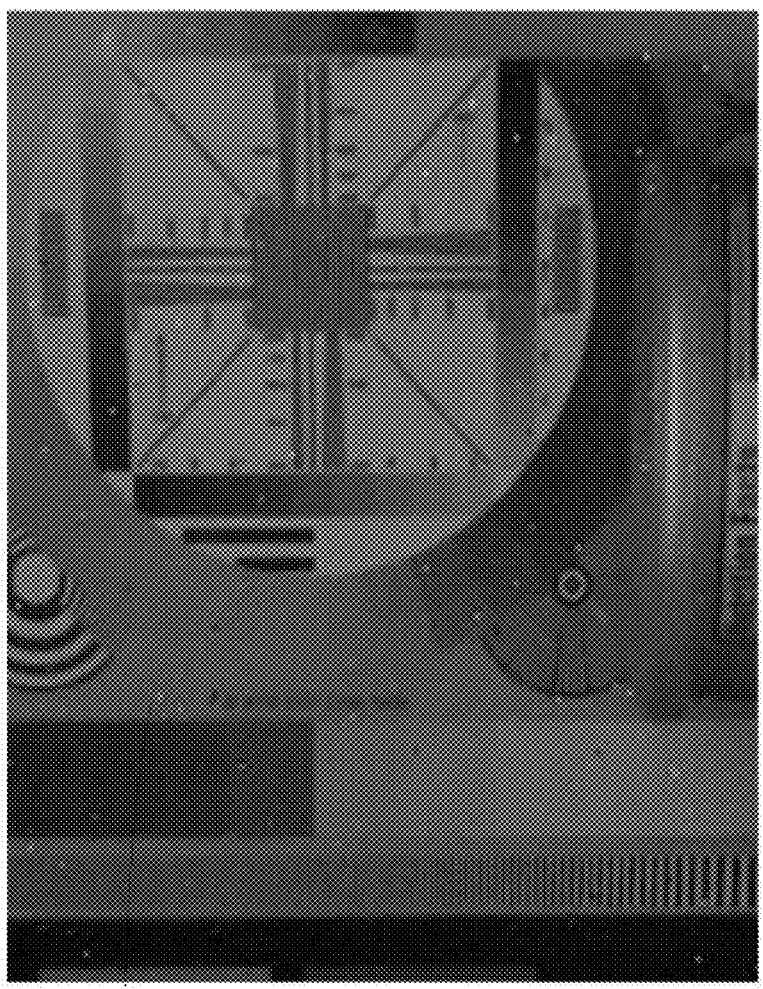
FIG. 4 is an example of wounded pixels in accordance with one embodiment of the disclosure.
Figure 5:
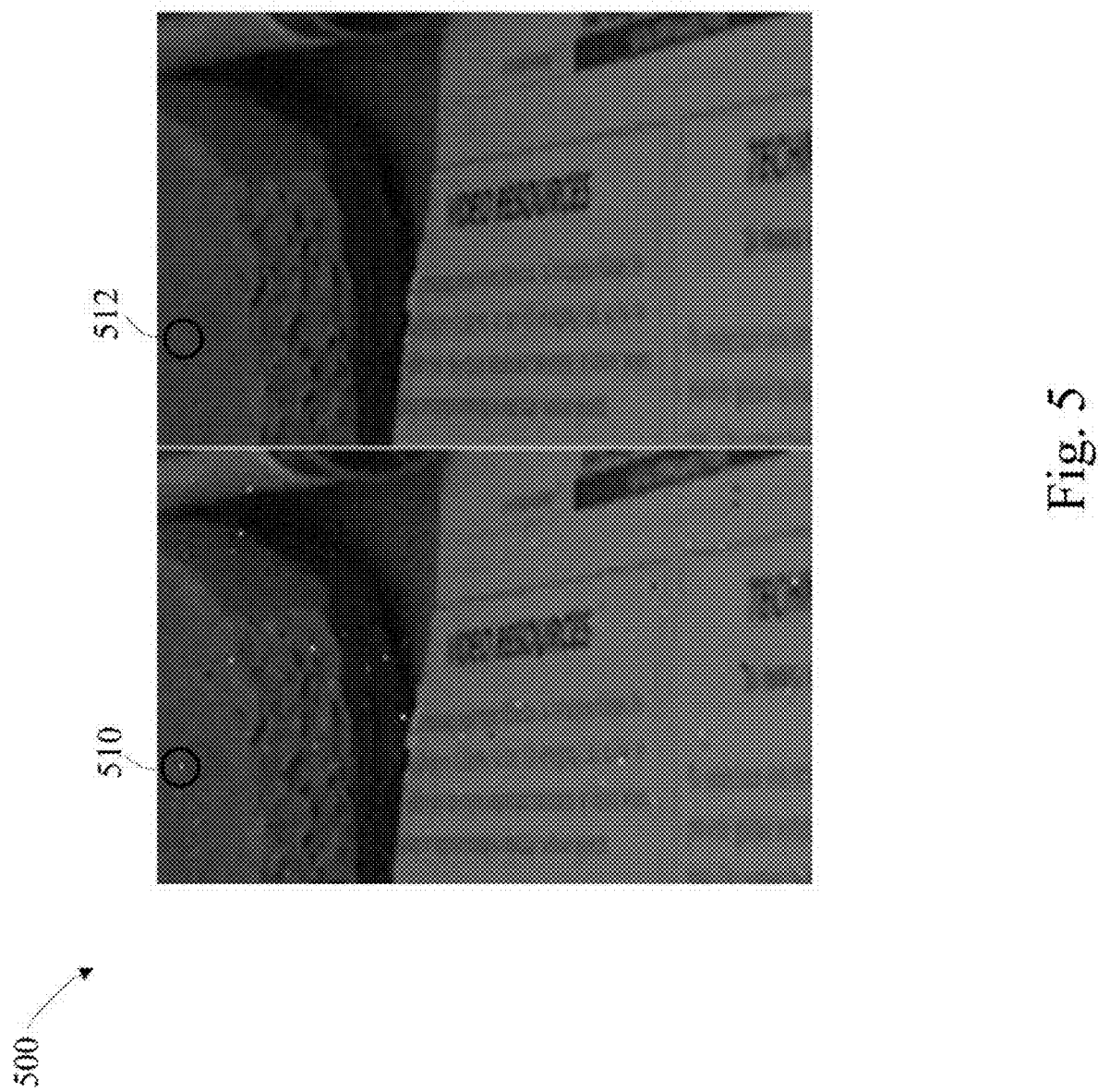
FIG. 5 is an example of wounded pixels and their correction in accordance with one embodiment of the disclosure.

FIG. 4, depicts wounded pixels such as 410. FIG. 5 depicts a wounded pixel 510 that has been corrected 512.

The multiple-to-one frame image methods may improve the signal to noise ratio, the dynamic range and the color trueness of an image. One example solution is based on image-fusion, which combines multiple input images into a single output image. The defect pixel signals are included in the input raw data, when these defect pixel signals are combined from multiple frames, they may exhibit excessive brightness deviation from neighboring pixels.

Multi-frame defect pixel detection and correction may include detecting pixel signals in multiple frames which exceed a brightness threshold of neighboring pixels and define those detected pixels as wounded pixels and record the location and number of recurrences of the detected wounded pixels in the multiple frames. If the wounded pixel reoccurs multiple times at the recorded location, it may exceed a detection threshold and may be redefined as a defect pixel.

A binary mask may be created for the recorded location of the defect pixel and correction may be applied based on the binary mask location. The defect pixel value may be replaced with the mean value of the neighboring pixels.

Wounded pixel signals do not differ drastically from healthy pixel signals. Currently, lowering the brightness threshold across-the-board for pixels may downgrade the captured image quality. In one example of this, if a picture of a night sky with a shining star is captured, current methods may remove the shining star. In another example in which an image is captured of a night scene of buildings, current methods may remove the lights, edges, and details of the buildings.

By applying the proposed solution a record is made of the occurrence and location of pixel signals which differ significantly from neighboring pixel signals. In the proposed solution defects which repeatedly occur at a specific location are corrected. The proposed solution protects fine details and edges. There are typically multiple wounded pixels in an image. Current methods correct fixed points, negating the prospect of correcting wounded points that randomly appear in an image.

FIG. 6 depicts an example method of defect pixel correction includes, receiving 610 at least one center pixel signal from a center pixel in a plurality of frames and receiving 612 a plurality of neighboring pixel signals from a plurality of neighboring pixels adjacent the center pixel in the plurality of frames. The neighboring pixels may be on one, two, three or four sides of the center pixel. The center pixel may not be at the geometric center of the pixels, the term center pixel denotes the pixel of interest. The center pixel and the neighboring pixels in one embodiment belong to the same color channel, i.e. red to red, green to green, or blue to blue, and the like. In another example the center pixel and neighboring pixels may belong to different color channels. The method also includes determining 614 a brightness of the center pixel signal in the plurality of frames, determining 616 the brightness of the plurality of neighboring pixel signals in the plurality of frames and determining 618 if the brightness of the center pixel signal exceeds a wounded pixel threshold of the plurality of neighboring pixel signals in the plurality of frames. The method further includes determining 620 a location of the center pixel having the brightness greater than the wounded pixel threshold in at least one frame of the plurality of frames, determining 622 a number of reoccurrences of the center pixel having the brightness greater than the wounded pixel threshold in the plurality of frames and determining 624 if the number of reoccurrences exceeds a defect pixel threshold and updating 626 the at least one center pixel signal to a mean of the plurality of neighboring pixel signals if the number of reoccurrences exceeds the defect pixel threshold.

FIG. 7 depicts another example method of defect pixel correction further including, determining 710 a color value of the center pixel signal in the plurality of frames and determining 712 the color value of the plurality of neighboring pixel signals in the plurality of frames. The neighboring pixels may be on one, two, three or four sides of the center pixel. The center pixel may not be at the geometric center of the pixels, the term center pixel denotes the pixel of interest. The method may also include determining 714 if the color value of the center pixel signal exceeds the wounded pixel threshold of the plurality of neighboring pixel signals in the plurality of frames, determining 716 the location of the center pixel having the color value greater than the wounded pixel threshold in at least one of the plurality of frames and determining 718 the number of reoccurrences of the center pixel having the color value greater than the wounded pixel threshold in the at least one of the plurality of frames.

The method of defect pixel correction may further include creating 720 a binary mask at the location of the center pixel exceeding the defect pixel threshold and replacing 722 the center pixel signal with a mean value of the neighboring pixel signals in the binary mask.

At least one of the plurality of neighboring pixels may be directly adjacent the center pixel. In one example the wounded pixel threshold may be adjusted based on a number of wounded pixels detected, i.e. if an excessive number of wounded pixels are detected, the threshold may be raised. In another embodiment, the number of the plurality of frames received may be adjusted. i.e., the number of frames may be greater than two. The time to capture the frames may be a determinative factor, i.e. the number of frames may be selected based on how many frames may be captured in a segment of time. In another example, the defect pixel threshold may be adjusted based on a number of defect pixels detected, i.e. if an excessive number of defective pixels are detected, the threshold may be raised so as not to bottleneck the image correction.

Figure 8:
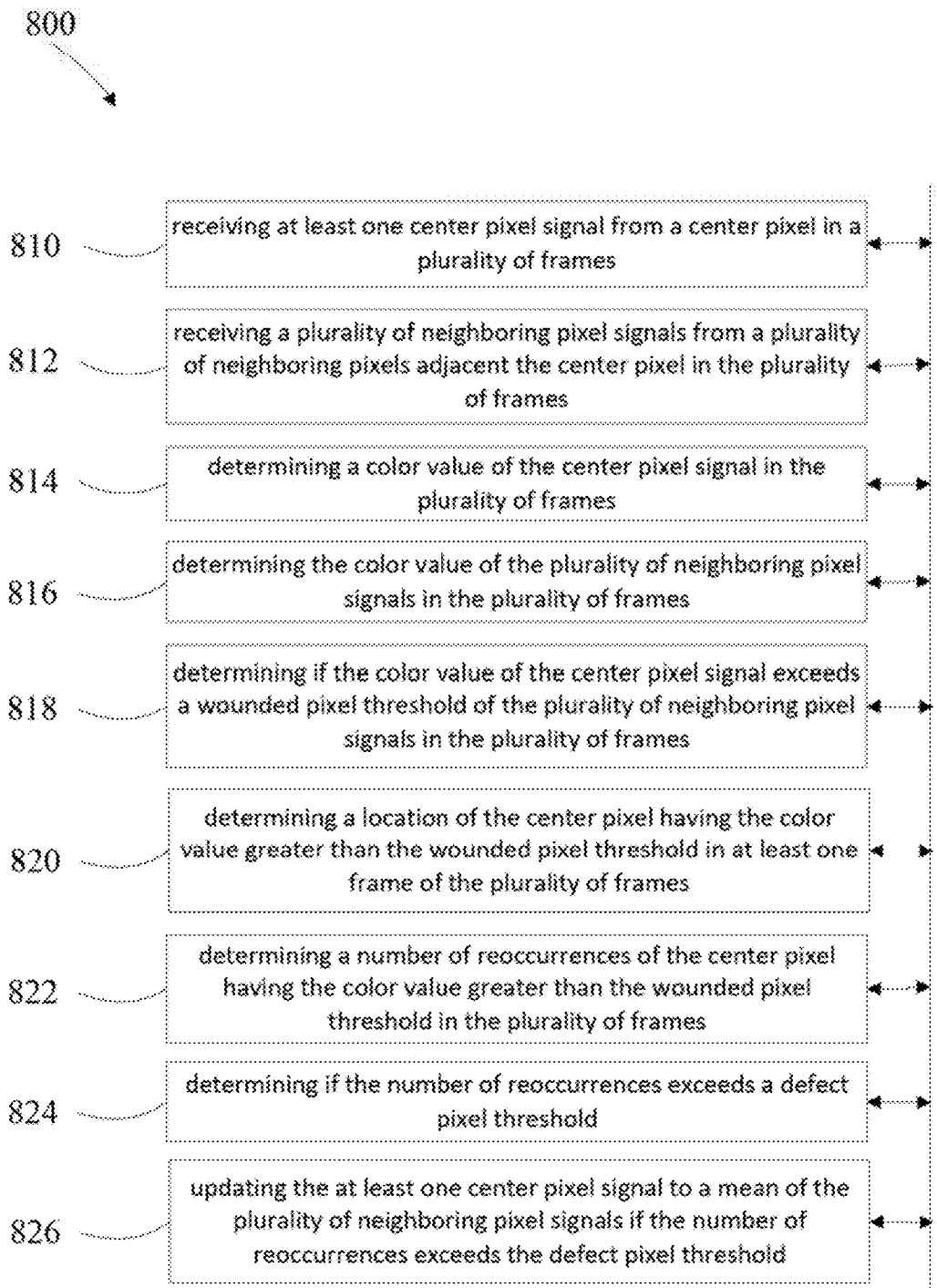
FIG. 8 is a third example method in accordance with one embodiment of the disclosure.

FIG. 8 depicts another example method of defect pixel correction that includes, receiving 810 at least one center pixel signal from a center pixel in a plurality of frames and receiving 812 a plurality of neighboring pixel signals from a plurality of neighboring pixels adjacent the center pixel in the plurality of frames. The neighboring pixels may be on one, two, three or four sides of the center pixel. The center pixel may not be at the geometric center of the pixels, the term center pixel denotes the pixel of interest. The method includes determining 814 a color value of the center pixel signal in the plurality of frames, determining 816 the color value of the plurality of neighboring pixel signals in the plurality of frames and determining 818 if the color value of the center pixel signal exceeds a wounded pixel threshold of the plurality of neighboring pixel signals in the plurality of frames. The method also includes determining 820 a location of the center pixel having the color value greater than the wounded pixel threshold in at least one frame of the plurality of frames, determining 822 a number of reoccurrences of the center pixel having the color value greater than the wounded pixel threshold in the plurality of frames, determining 824 if the number of reoccurrences exceeds a defect pixel threshold and updating 826 the at least one center pixel signal to a mean of the plurality of neighboring pixel signals if the number of reoccurrences exceeds the defect pixel threshold.

The method may also include creating a binary mask at the location of the center pixel exceeding the defect pixel threshold and replacing the center pixel signal with a mean value of the neighboring pixel signals in the binary mask.

At least one of the plurality of neighboring pixels may be directly adjacent the center pixel. In one example the wounded pixel threshold may be adjusted based on a number of wounded pixels detected, i.e. if an excessive number of wounded pixels are detected, the threshold may be raised. In another embodiment, the number of the plurality of frames received may be adjusted. i.e., the number of frames may be greater than two. The time to capture the frames may be a determinative factor, i.e. the number of frames may be selected based on how many frames may be captured in a segment of time. In another example, the defect pixel threshold may be adjusted based on a number of defect pixels detected, i.e. if an excessive number of defective pixels are detected, the threshold may be raised so as not to bottleneck the image correction.

Figure 9:
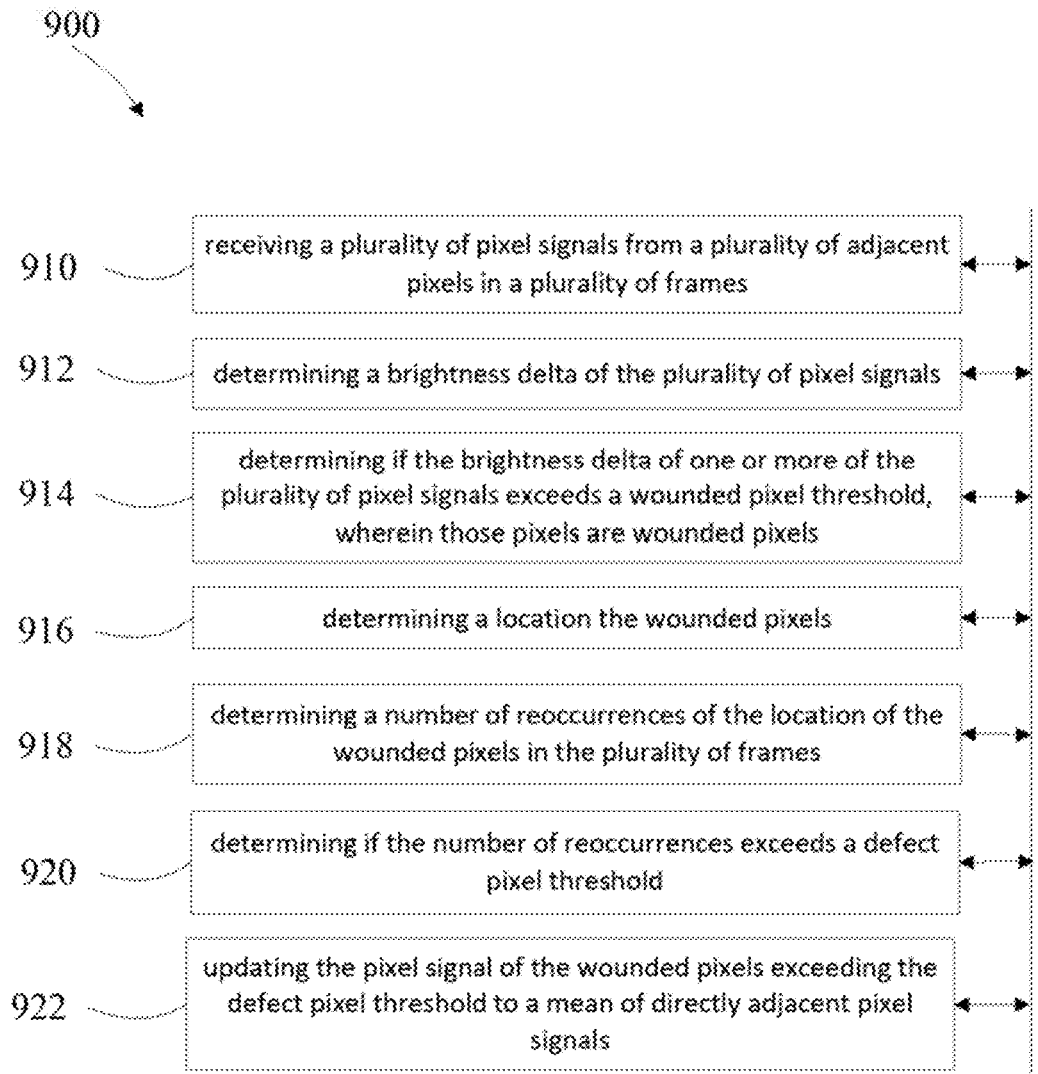
FIG. 9 is a fourth example method in accordance with one embodiment of the disclosure.

FIG. 9 depicts an example method of defect pixel correction that includes receiving 910 a plurality of pixel signals from a plurality of adjacent pixels in a plurality of frames, determining 912 a brightness delta of the plurality of pixel signals and determining 914 if the brightness delta of one or more of the plurality of pixel signals exceeds a wounded pixel threshold, wherein those pixels are termed wounded pixels. The method also includes determining 916 a location the wounded pixels, determining 918 a number of reoccurrences of the location of the wounded pixels in the plurality of frames, determining 920 if the number of reoccurrences exceeds a defect pixel threshold and updating 922 the pixel signal of the wounded pixels exceeding the defect pixel threshold to a mean of directly adjacent pixel signals. In one example, the brightness delta of the pixels may belong to the same color channel, i.e. red to red, green to green, or blue to blue, and the like. In another example the brightness delta of the pixels may belong to different color channels.

The wounded pixel threshold may be adjusted based on a number of wounded pixels detected, the number of the plurality of frames received may be adjusted and the defect pixel threshold may be adjusted based on a number of defect pixels detected.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a process or programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of defect pixel correction, comprising:
   receiving at least one center pixel signal from a center pixel in a plurality of frames;
   receiving a plurality of neighboring pixel signals from a plurality of neighboring pixels adjacent the center pixel in the plurality of frames;
   determining a brightness of the center pixel signal in the plurality of frames;
   determining the brightness of the plurality of neighboring pixel signals in the plurality of frames;
   determining if the brightness of the center pixel signal exceeds a wounded pixel threshold of the plurality of neighboring pixel signals in the plurality of frames;
   determining a location of the center pixel having the brightness greater than the wounded pixel threshold in at least one frame of the plurality of frames;
   determining a number of reoccurrences of the center pixel having the brightness greater than the wounded pixel threshold in the plurality of frames;
   determining if the number of reoccurrences exceeds a defect pixel threshold; and
   updating the at least one center pixel signal to a mean of the plurality of neighboring pixel signals if the number of reoccurrences exceeds the defect pixel threshold.

2. The method of defect pixel correction of claim 1, further comprising:
   determining a color value of the center pixel signal in the plurality of frames;
   determining the color value of the plurality of neighboring pixel signals in the plurality of frames;

determining if the color value of the center pixel signal exceeds the wounded pixel threshold of the plurality of neighboring pixel signals in the plurality of frames;

determining the location of the center pixel having the color value greater than the wounded pixel threshold in at least one of the plurality of frames; and determining the number of reoccurrences of the center pixel having the color value greater than the wounded pixel threshold in the at least one of the plurality of frames.

3. The method of defect pixel correction of claim 1, further comprising:

creating a binary mask at the location of the center pixel exceeding the defect pixel threshold; and replacing the center pixel signal with a mean value of the neighboring pixel signals in the binary mask.

4. The method of defect pixel correction of claim 1, wherein at least one of the plurality of neighboring pixels is directly adjacent the center pixel.

5. The method of defect pixel correction of claim 1, wherein the wounded pixel threshold is adjusted based on a number of wounded pixels detected.

6. The method of defect pixel correction of claim 1, wherein the number of the plurality of frames received is adjusted.

7. The method of defect pixel correction of claim 1, wherein the defect pixel threshold is adjusted based on a number of defect pixels detected.

8. The method of defect pixel correction of claim 1, wherein the center pixel and the neighboring pixels belong to the same color channel.

9. A method of defect pixel correction, comprising:

receiving at least one center pixel signal from a center pixel in a plurality of frames;

receiving a plurality of neighboring pixel signals from a plurality of neighboring pixels adjacent the center pixel in the plurality of frames;

determining a color value of the center pixel signal in the plurality of frames;

determining the color value of the plurality of neighboring pixel signals in the plurality of frames;

determining if the color value of the center pixel signal exceeds a wounded pixel threshold of the plurality of neighboring pixel signals in the plurality of frames;

determining a location of the center pixel having the color value greater than the wounded pixel threshold in at least one frame of the plurality of frames;

determining a number of reoccurrences of the center pixel having the color value greater than the wounded pixel threshold in the plurality of frames;

determining if the number of reoccurrences exceeds a defect pixel threshold; and updating the at least one center pixel signal to a mean of the plurality of neighboring pixel signals if the number of reoccurrences exceeds the defect pixel threshold.

10. The method of defect pixel correction of claim 9, further comprising:

creating a binary mask at the location of the center pixel exceeding the defect pixel threshold; and replacing the center pixel signal with a mean value of the neighboring pixel signals in the binary mask.

11. The method of defect pixel correction of claim 9, wherein at least one of the plurality of neighboring pixels is directly adjacent the center pixel.

12. The method of defect pixel correction of claim 9, wherein the wounded pixel threshold is adjusted based on a number of wounded pixels detected.

13. The method of defect pixel correction of claim 9, wherein the number of the plurality of frames received is adjusted.

14. The method of defect pixel correction of claim 9, wherein the defect pixel threshold is adjusted based on a number of defect pixels detected.

15. The method of defect pixel correction of claim 9, wherein the center pixel and the neighboring pixels belong to the same color channel.

16. A method of defect pixel correction, comprising:

receiving a plurality of pixel signals from a plurality of adjacent pixels in a plurality of frames;

determining a brightness delta of the plurality of pixel signals;

determining if the brightness delta of one or more of the plurality of pixel signals exceeds a wounded pixel threshold, wherein those pixels are wounded pixels;

determining a location the wounded pixels;

determining a number of reoccurrences of the location of the wounded pixels in the plurality of frames;

determining if the number of reoccurrences exceeds a defect pixel threshold; and updating the pixel signal of the wounded pixels exceeding the defect pixel threshold to a mean of directly adjacent pixel signals.

17. The method of defect pixel correction of claim 16, wherein the wounded pixel threshold is adjusted based on a number of wounded pixels detected.

18. The method of defect pixel correction of claim 16, wherein the number of the plurality of frames received is adjusted.

19. The method of defect pixel correction of claim 16, wherein the defect pixel threshold is adjusted based on a number of defect pixels detected.

20. The method of defect pixel correction of claim 16, wherein the plurality of adjacent pixels belong to the same color channel.

* * * * *